Aug. 8, 1944.  F. W. WHITLOCK  2,355,128
MEASURING DEVICE
Filed March 19, 1942  3 Sheets-Sheet 1
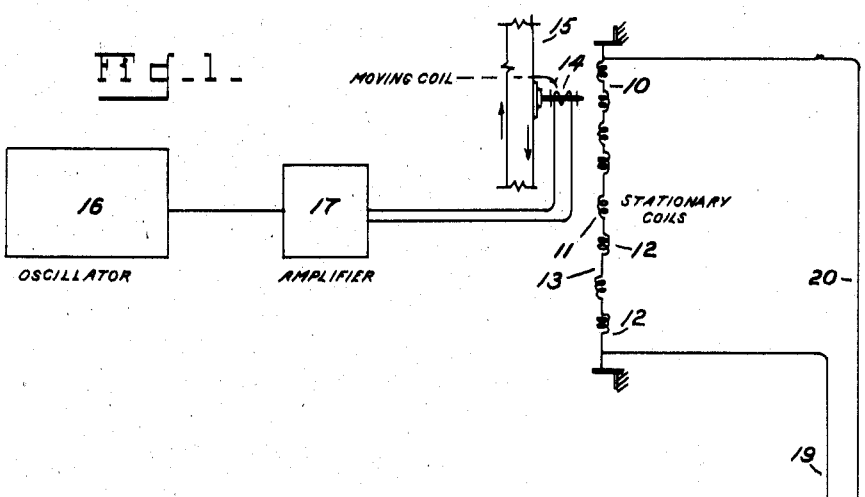
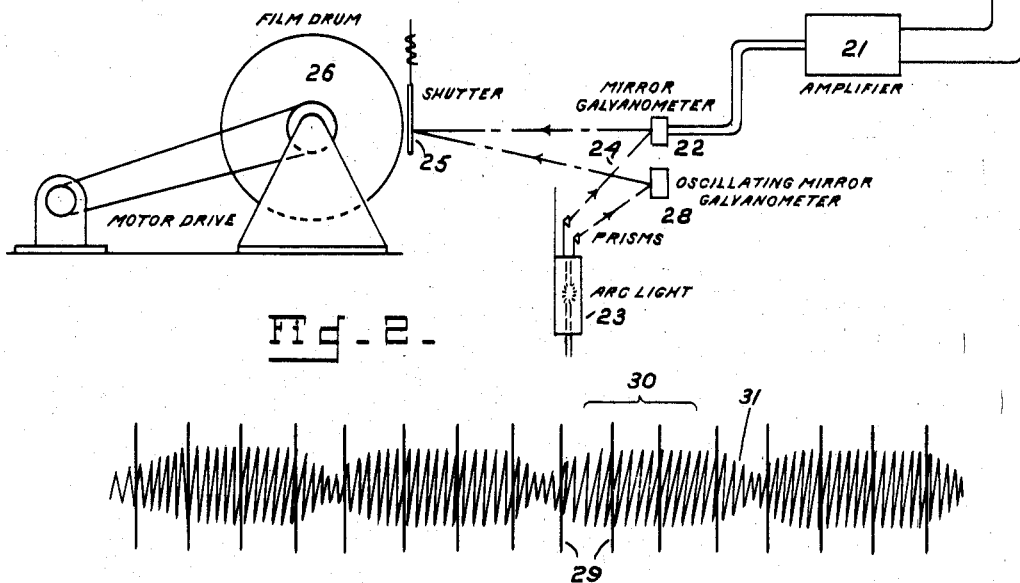
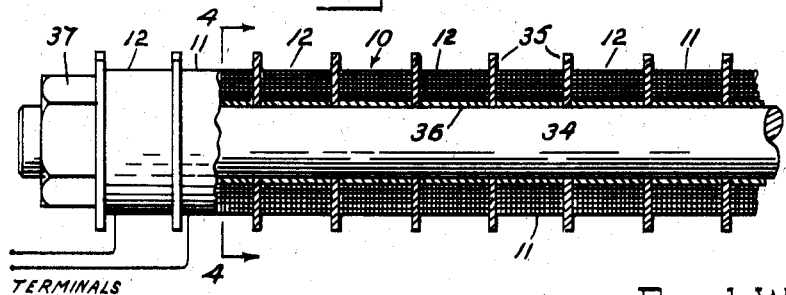
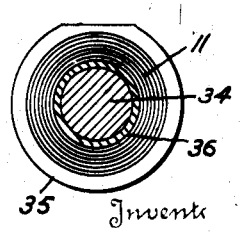
Fred W. Whitlock

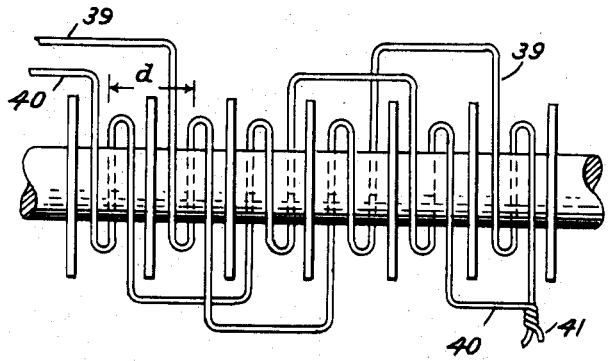
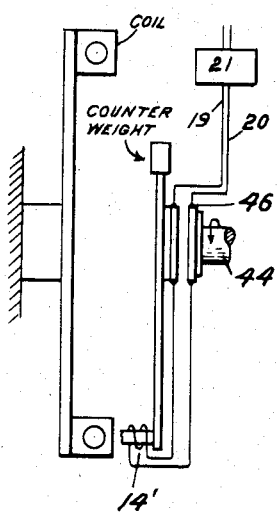
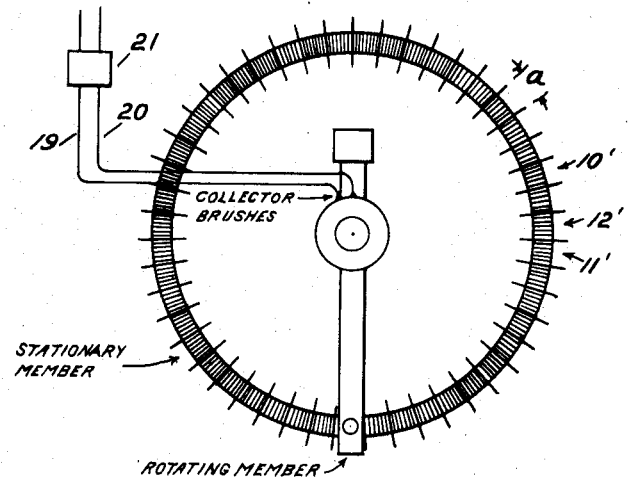

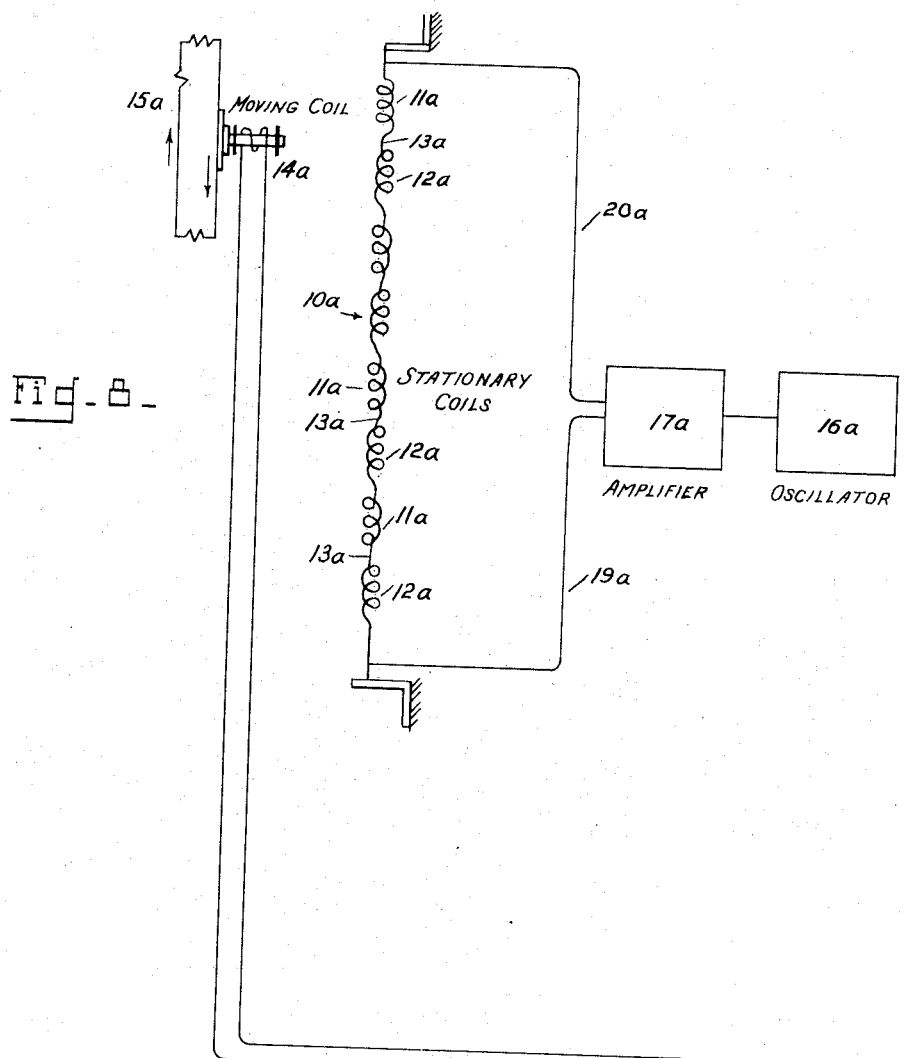
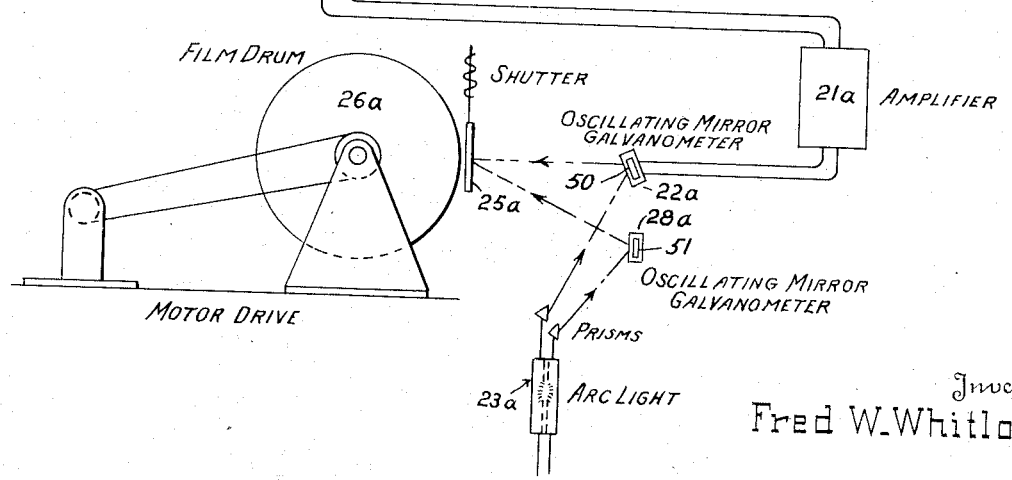

Patented Aug. 8, 1944

2,355,128

UNITED STATES PATENT OFFICE 2,355,128

MEASURING DEVICE

Fred W. Whitlock, United States Army, Aberdeen, Md.

Application March 19, 1942, Serial No. 435,328

7 Claims. (Cl. 234—29.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to measuring devices and is particularly concerned with apparatus for measuring velocity and acceleration of moving parts.

In mechanisms where the motion of a part occurs only once, it has been difficult to establish the character of motion of the part with accuracy, particularly when the forces of acceleration are very high and where the velocity of motion is very low. As an example of a mechanism in which studies of motion are desired, a gun recoil mechanism may be used. In the past, studies of recoil motion have been accomplished by attaching a stylus on the gun and a smoked plate on the carriage; and as the gun moves in recoil, a line is inscribed upon the smoked plate. Superimposed upon the record of gun travel is a time curve produced by a tuning fork carrying a stylus which indicates the time of gun travel in fixed time intervals. Velocities and accelerations may be ascertained roughly from this graph. The single line produced by the tuning fork stylus is of such character that accurate determinations of movement are very difficult.

It is an object of this invention to provide a system for measuring distance-time relationships of a moving object in such a manner that increments of distance and time may be established with great definiteness upon a record chart whereby the time-distance values may be used to establish velocity and acceleration of the parts with great accuracy.

It is a further object of the invention to provide a mode of establishing time-distance relationships in any mechanism involving linear or rotational movement of either repetitive or non-repetitive character.

The details of the invention may be understood from a reading of the description below in connection with the drawings in which:

Figure 1 is a diagrammatic view of the apparatus used in practicing the invention;

Figure 2 is a sample of the type of record which is produced by the apparatus;

Figure 3 is a side elevation, partly in section, showing one of the components of the apparatus;

Figure 4 is a section on the line 4—4 of Figure 3;

Figure 5 is a schematic elevation of the apparatus of Figure 3 showing the mode of winding;

Figure 6 is a diagrammatic side elevation of an alternate arrangement of apparatus as used for determining angular movement versus time;

Figure 7 is a front elevation of the apparatus of Figure 6; and

Fig. 8 is a diagrammatic view of another form of apparatus that may be used in practicing the invention.

Reference may first be made to Figure 1 wherein 10 indicates a coil assembly having pluralities of coils 11, wound in the same sense, alternating with pluralities of coils 12 wound in the opposite sense; the coils 11 and 12 being serially connected as at 13. The assembly 10 may be mounted on a fixed part of a machine structure and is of substantially equal length to the motion path which is to be studied. Upon a moving part of the mechanism there is a coil 14 closely related to the assembly 10 and adapted to travel therealong. The moving element to which the coil 14 is attached is indicated at 15. The coil 14 is energized by a beat frequency oscillator 16, through an amplifier 17 at high frequency. The actual frequency used will depend upon the speed of motion to be studied; for practical use in the study of recoil mechanisms, a convenient frequency would be in the neighborhood of 6,500 cycles.

The ends of the coil assembly 10 are connected through suitable wires 19 and 20 to an amplifier 21 whose output energizes a mirror galvanometer 22. A lamp having a point source of light such as the arc light 23, directs a beam 24 upon the mirror of the galvanometer 22; whence the beam is reflected through a shutter 25 to a rotating film drum 26 so that the light beam sweeps over the film during drum rotation to produce a record such as that indicated in Figure 2. For convenience in establishing the time factor on the record, a second mirror galvanometer 28 is vibrated at constant frequency and high amplitude, the frequency being sufficiently low so that time lines such as 29 in Figure 2 are superimposed on the motion record, the galvanometer reflecting a beam through the shutter 25 to the film drum 26.

Since the serially connected windings 11 and 12 on the assembly 10 are oppositely wound, nodal points are produced between adjacent pairs of coils. Now, as the coil 14 is energized by the oscillator 16, there will be a transfer of energy, by induction, to each of the coils 11 and 12 as the coil 14 comes opposite each one of them. While the coil 14 is opposite one coil, 11 for instance, the galvanometer 22 will produce a record on the film on the drum 26 similar to that shown in Figure 2 in the zone 30. As the coil 14 moves between any two coils 11 and 12, the amplitude of the induced voltage in the coils will become substantially zero due to the phase change resulting from the opposite winding of coils 11 and 12, as indicated at 31 in Figure 2. This node 31 on the photographic record, thus indicates a definite point in the travel of the moving part of the mechanism with respect to the fixed part of the mechanism. By using a high frequency oscillator in the system, the nodes and loops produced on the photographic record give a clear and unmistakable picture of the distance increments through which the mechanism moves. The timing lines 29 form a convenient time datum directly on the photographic record so that the time for any increment of movement may be established definitely. For instance, if each distance increment (i. e., the center distance between coils 11 and 12) is 1 inch, and if the timing lines 29 are 1/500 second apart, it will be apparent in Figure 2 that the 1 inch distance is traveled in approximately 5/500 second. If the motion of the mechanism is not uniform, it is apparent that the time for each 1 inch of travel is readily established from a record such as that shown in Figure 2. Thus, point-to-point average velocities may be established and point-to-point average accelerations may also be established. By diminishing the length of successive coils 11 and 12, the point-to-point velocities may be established more frequently, and the detailed characteristics of motion may be studied with greater accuracy.

Figure 3 shows a typical mechanical embodiment of the assembly 10 wherein 34 is a rod over which are slipped alternate washers 35 and spacer sleeves 36 forming a succession of annular grooves within which the windings 11 and 12 are wound. The spacers and washers may be secured upon the rod 34 by a nut 37.

The windings 11 and 12 may be serially arranged as shown in Figure 1, or alternately the arrangement of Figure 5 may be used in which a first wire 39 is wound continuously into alternate grooves in the same direction. Another wire 40 is wound in the other alternate groove, in the same direction as the first wire. One end of the wire 39 is secured to the corresponding end of the other wire 40, as at 41, while the other ends of both wires are connected to the leads 19, 20 in Fig. 1; this winding gives the same opposite phasing effect as in the arrangement of Figure 1.

Although in Figure 1 I show the coil 14 energized by the oscillator while the assembly 10 acts as the pick-up, this relationship may be reversed. That is, the assembly 10 could be energized by the oscillator and then coil 14 could be connected to the oscillograph. This latter form of apparatus for practicing the invention is illustrated schematically in Figure 8 of the drawings. In this figure, elements or assemblies of apparatus identical with those shown in Figure 1 have been designated by the same reference characters but with the letter $a$ applied thereto. The numerals 50 and 51 in Figure 8 designate the vibrator coils and/or mirrors of galvanometers 22a and 28a. Furthermore, the coil 14 could be on the fixed part of the mechanism while the assembly 10 could be on the moving part of the mechanism, or the coils may be mounted on relatively movable parts where both have positive movement.

If the system herein taught is to be used for determination of angular movement rather than linear movement, the system may be arranged as in Figures 6 and 7 wherein 10' indicates the oppositely wound coil assembly formed as an annulus. The coil 14', whose weight and physical dimensions may be small, is secured to a rotating member 44. Connections from the coil 14' may be made through flexible wires if the total amount of angular motion amounts to only a few revolutions, or if the motion amounts to many revolutions, connections to the coil 14' may be made through a brush and slip ring assembly 46. As shown in Figure 7, each winding increment 11' and 12' will intercept an angle $a$, and the photographic record strip obtained by operation of the apparatus will show angular distance with respect to time rather than linear distance with respect to time as in the arrangement of Figure 1.

The photographic recording apparatus, diagrammatically illustrated in Figure 1, is not a specific part of the invention but is shown merely as one well-known and convenient means of obtaining a permanent record for motion studies. There are other forms of apparatus to secure the same result which may be used in connection with components of the invention described above.

It is contemplated that this invention may be used constructively for analyzing motions, accelerations, and stresses in many sorts of mechanisms where motions are nonrepetitive. For instance, accurate studies may be made of vehicular suspensions, spring actions and the like. It is appreciated that apparatus for motion studies for repetitive events have been developed to great accuracy, but the instrumentation for such types of study does not lend itself to nonrepetitive motions. The accuracy of the instrumentation used for the study of nonrepetitive motions has been so bad as to prevent constructive results, and it is believed that the teaching of this invention will assist in opening a new field of research for the improvement of mechanisms of many varieties. It will further be appreciated that the apparatus of this invention will be highly portable in character and fairly universal in scope so that complicated set-ups are unnecessary. Furthermore, this apparatus may be used on vehicles in motion without danger of spoilage of the apparatus or of the results obtained therefrom.

One of the particular advantages resulting from the invention is the node-and-loop form of record, which may be interpreted accurately even though low and high velocities are registered on the same record. The node-and-loop record is made possible by the modulation of the high frequency A. C. as outlined above. Previous single line time-distance records could be read accurately only in a small range of velocities. If the apparatus included both low and high velocity operation, the record produced was illegible in extreme velocity zones.

While I have described my invention in detail in its presently preferred embodiments, it will be obvious to those skilled in the art, after understanding my invention, that various changes and modifications may be made without departing from the spirit or scope thereof. I aim in the appended claims to cover all proper modifications and changes.

I claim:

1. Apparatus for measuring the time-distance characteristics of relatively movable members comprising a plurality of sequentially arranged oppositely phased windings on one member, a coil on the other member movable past the said windings for electromagnetic coupling therewith, means to energize the windings with high frequency A. C., and means to record the energy picked up by said coil.

2. In apparatus for measuring time-distance characteristics of relatively movable members, a core piece, a coil wound upon said core having a plurality of increments sequentially of opposite phase, means securing said core piece and coil to one of the members, a coil secured to the other member in coupled relation to part of the first coil, means to energize one of said coils with A. C. energy at a frequency substantially greater than the frequency of expected vibration frequencies occurring during relative movement of the members, and means to record the energy picked up by the other of said coils during relative movement of the members.

3. Apparatus for measuring the time-distance characteristics of relatively movable members comprising a plurality of sequentially arranged oppositely phased windings on one member, a coil on the other member coupling electromagnetically with said windings, means to energize the said windings with high frequency alternating current, and means to record the energy picked up by said coil.

4. Apparatus for measuring the velocity of a movable object comprising a plurality of fixed sequentially arranged oppositely phased windings, a coil on the movable object coupling electromagnetically with said windings, means to energize the said windings with high frequency alternating current, and means to record the energy picked up by said coil.

5. Apparatus for measuring the time-distance characteristics of relatively movable members comprising a plurality of sequentially arranged oppositely phased windings on one member, a coil on the other member coupling electromagnetically with said windings, means to energize the said coil with high frequency alternating current, and means to record the energy picked up by said windings.

6. Apparatus for measuring the velocity of a movable object comprising a plurality of fixed sequentially arranged oppositely phased windings, a coil on the movable object electromagnetically coupling with said windings, means to energize the said coil with high frequency alternating current, and means to record the energy picked up by said windings.

7. Apparatus for measuring the velocity of one body with respect to another body, the said apparatus comprising electrical means including a plurality of adjacent sequentially arranged oppositely phased coils on one of said bodies, electrical means including a coil on the other of said bodies coupling electromagnetically with said oppositely phased coils, means for energizing one of said electrical means with high frequency alternating current, and means for translating into graphical record form the alternating current generated in the other of said electrical means during the relative motion of said bodies.

FRED W. WHITLOCK.